Aug. 19, 1924.  
J. F. O'CONNOR  
1,505,416  
FRICTION SHOCK ABSORBING MECHANISM  
Filed Sept. 8, 1921   2 Sheets-Sheet 1
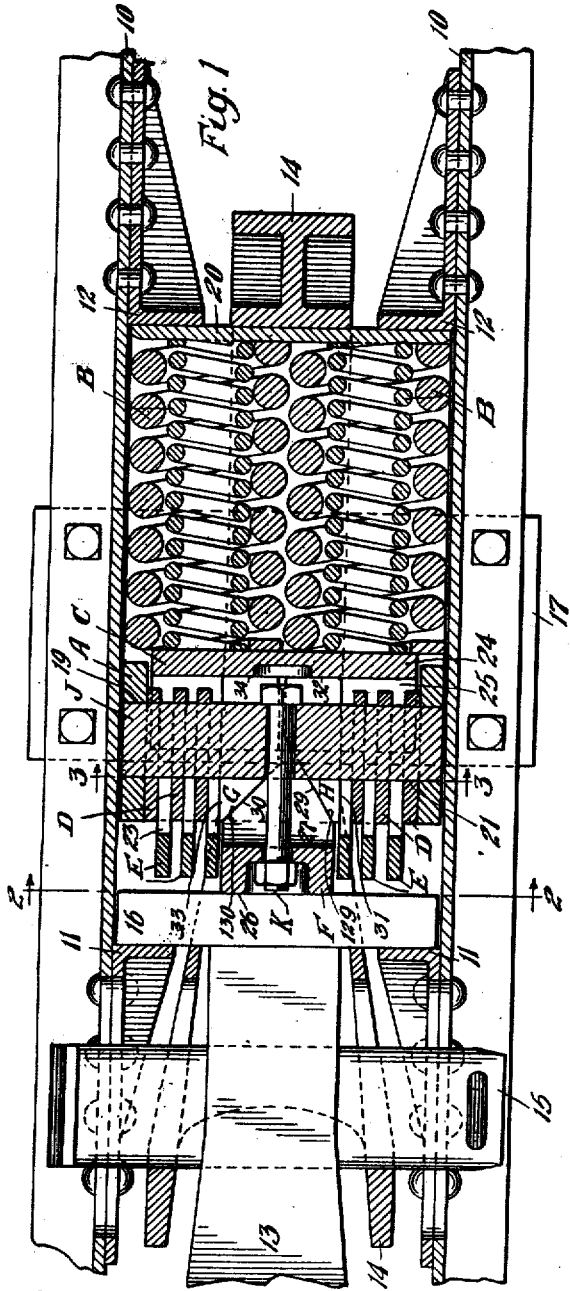
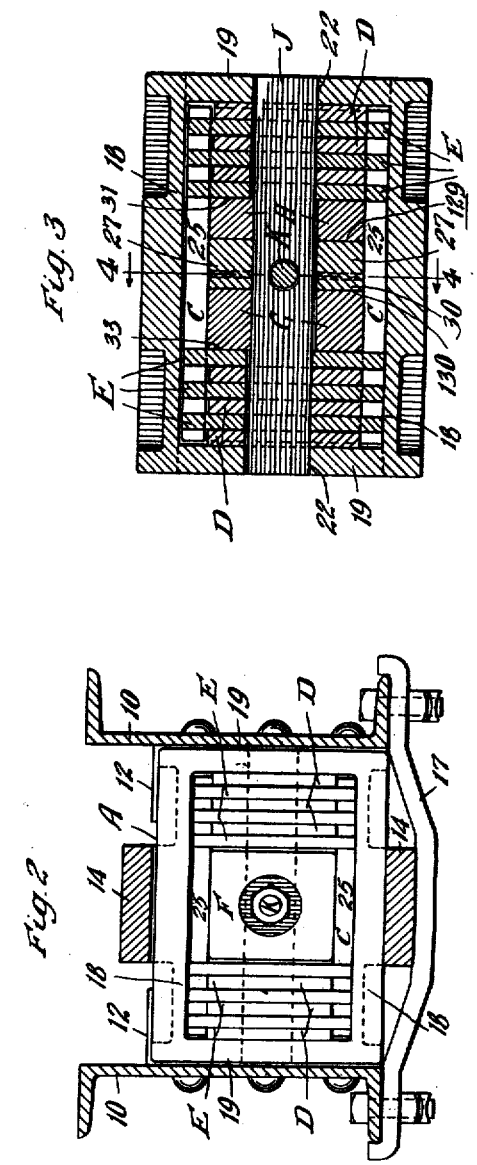
Witnesses  
Wm. Geiger
Inventor  
John F. O'Connor  
By Geo. I. Haight  
His Atty Aug. 19, 1924.
J. F. O'CONNOR
1,505,416
FRICTION SHOCK ABSORBING MECHANISM
Filed Sept. 8, 1921    2 Sheets-Sheet 2
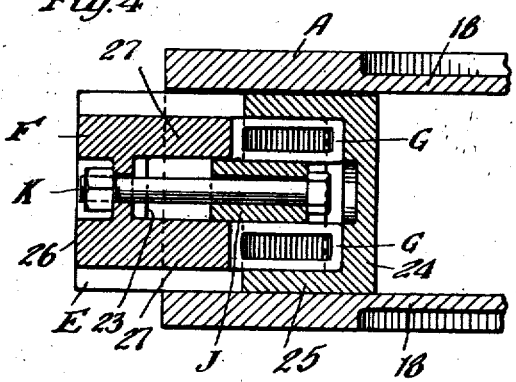
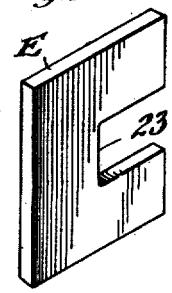
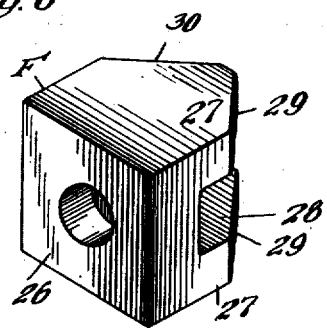
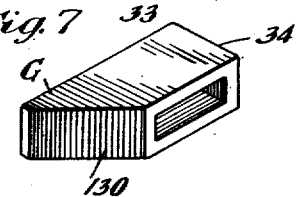
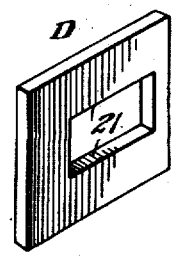
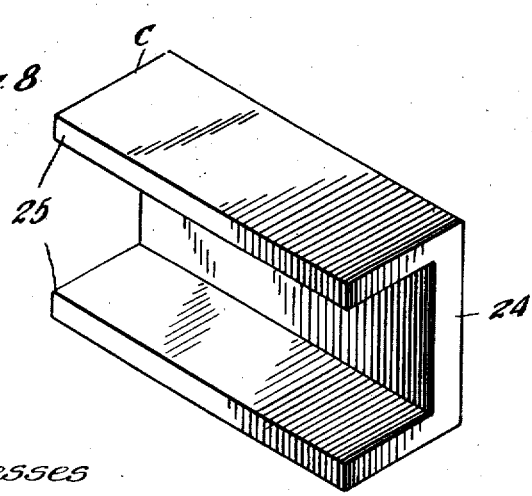
Witnesses
Inventor
John F. O'Connor
By Geo. I. Haight
His Atty.

Patented Aug. 19, 1924.

1,505,416

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed September 8, 1921. Serial No. 499,211.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high-capacity friction shock absorbing mechanism especially adapted for railway draft riggings and wherein are provided large frictional wearing areas, to the end that the pressure per unit of frictional area may be maintained at a relatively low figure.

Another object of the invention is to provide a mechanism of the character indicated of that type employing intercalated friction elements, the mechanism being so arranged that certain release is obtained and without the aid of anti-friction rollers, anti-friction pads or other relatively expensive expedients and more especially by employing a wedging system consisting of few parts of the simplest construction and form with regard to manufacture.

A specific object of the invention is to provide a simple and inexpensive method of anchoring the stationary friction plates in a mechanism of the character above indicated.

In the drawings forming a part of this specification, Figure 1 is a horizontal longitudinal sectional view of a portion of a railway draft rigging showing my improvements in connection therewith. Fig. 2 is a vertical transverse sectional view corresponding substantially to the line 2—2 of Fig. 1. Fig. 3 is an enlarged vertical transverse sectional view of a shock absorbing mechanism proper, taken on the line 3—3 of Fig. 1. Fig. 4 is a broken vertical longitudinal sectional view corresponding to the section line 4—4 of Fig. 3. Figs. 5, 6, 7, 8 and 9 are detail perspectives of one of the movable friction plates, the wedge pressure-transmitting block, one of the shoes, the spring follower and one of the stationary plates, respectively.

In said drawings, 10—10 denote channel draft sills of a railway car to the inner faces of which are secured front stop lugs 11—11 and rear stop lugs 12—12. A portion of a drawbar is indicated at 13, the same being operatively associated with the shock absorbing mechanism proper by a hooded cast yoke 14 and coupler key 15. The shock absorbing mechanism proper and a front follower 16 are disposed within the yoke, all of the parts being separated in operative position by a detachable saddle plate 17.

The improved shock absorbing mechanism proper, as shown, comprises, broadly, a casting A which may be variously termed a shell, follower-acting member, or column-load-sustaining member; twin arranged springs B—B; a spring follower C; a series of relatively stationary friction plates D—D; a series of relatively movable friction plates E—E; a pressure-transmitting wedge block F; a pair of friction-shoes G—G; a pair of wedge-friction-shoes H—H; a holding key J; and a retainer bolt K.

The casting A is formed with upper and lower horizontal walls 18—18, side walls 19—19 and rear vertical connecting wall 20. The side walls 19 are left relatively short so as to provide lateral openings to permit insertion and removal of certain of the parts. The rear wall 20 cooperates with the stop lugs 12 in the usual manner of an ordinary rear follower.

The main springs B—B are of well-known form, each preferably comprising an outer heavy coil and an inner-lighter-nested coil. Said springs bear at their rear ends against the wall 20 and at their forward ends against the follower C.

It will be noted that the forward or front end of the casting A provides a hollow rectangular box-like shell within which are accommodated the stationary and movable plates. To anchor the stationary plates D against longitudinal movement with respect to the casting A while leaving them responsive to laterally applied pressure, I have provided a very simple arrangement which facilitates the assembling of the parts and replacement thereof. For this purpose, each of the stationary plates D, as best shown in Fig. 9, is of rectangular plate form having a rectangular opening 21 therein, approximately centrally disposed, although preferably located somewhat nearer the inner end than the outer end. By means of said openings 21 the plates D are adapted to be strung upon the correspondingly shaped heavy cross-bar or anchoring-key J which is inserted through suitable transversely alined openings 22—22 in the side walls 19 of the casting A. By means of the retainer bolt and remaining elements of the friction-creating-mechanism, said key J will be held against lateral displacement, as will be apparent from an inspection of Fig. 1.

The movable friction plates E are also of plate form and rectangular outline, each being recessed forwardly from its rear end as indicated at 23 to thereby adapt the movable plates to slide longitudinally over the stationary key J. The stationary and movable friction plates are preferably alternated and divided into two laterally separated groups to leave a space therebetween for the wedging system.

The spring follower C, as best shown in Figs. 4 and 8, is of heavy channel cross-section having a main vertically extending web 24 and upper and lower forwardly extended flanges 25—25. Said flanges 25 straddle the stationary friction plates D and the shoes G and H and engage the inner ends of the movable plates E.

The wedging system, as shown, comprises the block F, the two shoes G—G and the two shoes H—H. The block F is formed with an outer transversely extending flat face 26 bearing against the follower 16. Inwardly thereof, the block F is formed with upper and lower heavy flanges 27—27 separated by a space 28 so as to adapt said flanges 27—27 to straddle the key J and allow the block F to move longitudinally, with respect thereto as shown in Fig. 4. Each of said flanges 27 is formed on one side thereof with a wedge face 29 extending at a relatively acute angle with respect to the center line of the mechanism and actuating forces applied substantially parallel thereto.

Two wedge-friction-shoes H are employed, one above the other below the key J. Each is of like construction and is formed on its outer side with a longitudinally extending flat face 31 engaging the corresponding innermost movable plate E. On its inner side, each shoe H is formed with a wedge face 129 extending at the same angle as and cooperable with the corresponding wedge face 29 of the block F. The inner end of each shoe H extends transversely as indicated at 32 and bears against the web 24 of the follower C.

The two shoes G are of like construction, each being provided on its outer side with a longitudinally extending surface 33 engaging with the corresponding movable plate E. On its inner side, each shoe G is formed with an inclined face 130, extending at the same angle as and cooperable with the corresponding face 30 of the block F. At its inner end, each shoe G is formed with a transversely extending face 34 adapted to bear on the web 24 of the follower C.

The parts are held in assembled relation by means of the retainer bolt K which is anchored at its rear end against the inner face of the key J and at its forward end within a suitable socket formed in the block F. In actual practice, a space of approximately one-half inch will normally be left between the follower 16 and the outer ends of the plates E.

In carrying out my invention, the casting A will preferably be made of malleable iron, which as is well known, possesses a certain amount of elasticity and I make use of this factor in carrying out my invention. As heretofore described, the wedge faces 29 and 129 extend at an acute angle with respect to the axis of the mechanism whereas the faces 30 and 130 extend at a relatively blunt angle with respect to said axis. In actual practice the wedge faces 29 and 129 will be made sufficiently acute so as to function in the ordinary manner of true wedge faces to produce the necessary or desirable lateral pressure or wedging action under forces applied parallel to the center line of the mechanism. On the contrary, the faces 30 and 130 will be made to extend at such a blunt angle with respect to said actuating forces as to eliminate wedging action therebetween, thereby producing, in effect, a "freezing" of the block F, and the shoes G during compression. The angle of said faces 30 and 130 will vary greatly in accordance with the metals employed in the elements F and G but will be dependent upon the known co-efficient of friction between the metals employed in said two elements. With this arrangement, it will be seen that, in compression, under forces applied parallel or substantially parallel to the center line of the mechanism, the wedge effect will be the same as produced by the wedge-shoes H cooperating with another wedge member which combines the three elements F and G.

When force is applied to compress the mechanism, as under buff, the follower 16 will move inwardly together with the wedging system for an amount corresponding to the space normally left between the follower 16 and plates E. This will remove the spring follower C from engagement with the movable plates and will set up the desired lateral pressure on the intercalated plates. As will be evident to those skilled in the art, the degree of wedging-action thus set up may be regulated by the distance which the wedging system is allowed to move independently of the movable plates. After the follower 16 engages the movable plates, the latter and the wedging system will move inward simultaneously, thus generating the desired capacity.

As the lateral pressure or wedging action is exerted during compression, it is evident that a certain amount of expansion will take place laterally in the shell portion of the casting A, and there will also be some slight amount of compression, due to elasticity, in the stationary and movable plates. This action obviously will set up tension forces in the shell and expansion forces in the plates which, upon removal of the actuating force from the draw bar, will automatically and instantaneously react laterally or radially inwardly, that is, at right angles to the center line of the mechanism and the compression-acting forces. With respect to such radially inwardly exerted forces, it will be evident that the faces 29 and 129 will extend at a blunt and non-wedge-acting angle, whereas the faces 30 and 130 will become wedge faces and the collapse of the wedging system will take place between the elements G and the block F. The lateral pressure on the plates is thus automatically and substantially instantaneously reduced, so as to allow the springs G to project the wedging system outwardly, which action will continue independently of any movement of the plates E until the follower C, through the flanges 25 thereof, engages the inner ends of the plates E and thereafter project the latter outwardly and thus restore all of the parts to their original normal position.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a column-load-sustaining member having a hollow section; of a plurality of relatively stationary friction plates within said hollow section; a readily removable key extending centrally through said plates, anchoring the same to the sides of said member against movement longitudinally thereof; a plurality of relatively longitudinally movable friction plates intercalated with said stationary plates and all responsive to lateral pressure; a spring resistance; and pressure-transmitting and lateral-pressure-creating means cooperable with said intercalated plates.

2. In a friction shock absorbing mechanism adapted to be supported between the ft sills of a car, the combination with a )wer-acting member having a hollow l section; of a plurality of relatively .ionary friction plates within said shell section; a removable transversely extending key on which said stationary plates are anchored, said key being supported in said shell section and having the opposite ends thereof abutting the inner faces of said draft sills; a plurality of movable friction plates intercalated with said stationary plates; a spring resistance; and pressure-transmitting and lateral-pressure-creating means cooperable with said intercalated plates.

3. In a friction shock absorbing mechanism, the combination with a column-load-sustaining member having a hollow section; of a plurality of relatively stationary friction plates within said hollow section; readily detachable means extending through said plates for anchoring the same to said member against movement longitudinally thereof; a plurality of relatively longitudinally movable friction plates intercalated with said stationary plates and all responsive to lateral pressure; a spring resistance; and pressure-transmitting and lateral-pressure-creating means cooperable with said intercalated plates, said intercalated plates being divided into two laterally separated groups and said pressure-creating means being located between said groups.

4. In a friction shock absorbing mechanism, the combination with a column-load-sustaining member having a hollow section; of a plurality of relatively stationary friction plates within said hollow section; detachable means for anchoring said plates to said member against movement longitudinally thereof; a plurality of relatively longitudinally movable friction plates intercalated with said stationary plates and all responsive to lateral pressure; a spring resistance; pressure-transmitting and lateral-pressure-creating means cooperable with said intercalated plates; and a spring follower interposed between said spring resistance and the inner ends of said movable plates, said spring follower having forwardly extended flanges straddling said stationary plates.

5. In a friction shock absorbing mechanism, the combination with a column-load-sustaining member having a hollow section; of a plurality of relatively stationary friction plates within said hollow section; detachable means for anchoring said plates to said member against movement longitudinally thereof; a plurality of relatively longitudinally movable friction plates intercalated with said stationary plates and all responsive to lateral-pressure; a spring resistance; pressure-transmitting and lateral-pressure-creating means cooperable with said intercalated plates, said intercalated plates being divided into two laterally separated groups and said pressure-creating means being located between said groups;

and a spring follower interposed between said spring resistance and the inner ends of said movable plates, said follower having upper and lower flanges straddling the stationary plates.

6. In a friction shock absorbing mechanism, the combination with a follower-acting member having a hollow shell section; of a plurality of relatively stationary friction plates within said shell section; a removable transversely extending key supported in said shell section and on which said stationary plates are anchored; a plurality of movable friction plates intercalated with said stationary plates; a spring resistance; and pressure-transmitting and lateral-pressure-creating means cooperable with said intercalated plates, said means including a central pressure-transmitting block, and independent shoes cooperable with the block, said shoes being disposed on opposite sides of said key.

7. In a friction shock absorbing mechanism, the combination with a follower-acting member having a hollow shell section; of a plurality of relatively stationary friction plates within said shell section; a removable transversely extending key supported in said shell section and on which said stationary plates are anchored; a plurality of movable friction plates intercalated with said stationary plates; a spring resistance; pressure-transmitting and lateral-pressure-creating means cooperable with said intercalated plates, said means including a central pressure-transmitting block, and independent shoes cooperable with the block, said shoes being disposed on opposite sides of said key; and a spring follower interposed between said spring resistance and the inner ends of the movable plates, said follower having upper and lower forwardly extended flanges which straddle said stationary plates and said shoes.

8. In a friction shock absorbing mechanism, the combination with a follower-acting member having a hollow shell section; of a plurality of relatively stationary friction plates within said shell section; a removable transversely extending key supported in said shell section and on which said stationary plates are anchored; a plurality of movable friction plates intercalated with said stationary plates; a spring resistance; and pressure-transmitting and lateral-pressure-creating means cooperable with said intercalated plates, said means including a pressure-transmitting block having faces extended at a wedge-acting angle with respect to the center line of the mechanism and faces inclined at a non-wedge-acting angle with respect to the center line of the mechanism, and friction-shoes having inclined faces cooperable with said wedge-acting and non-wedge-acting faces of the block.

9. In a friction shock absorbing mechanism, the combination with a follower acting member having a hollow shell section; of a plurality of friction plates anchored within said shell, against longitudinal movement therein, but adapted to have limited lateral movement therein; a plurality of friction plates relatively movable to and intercalated with said first named plates; a spring resistance; and pressure transmitting and lateral pressure creating means co-operable with said intercalated plates, said means including a pressure transmitting block having a face extended at a relatively keen angle with respect to the center line of the mechanism and a face inclined at a relatively blunt angle with respect to the center line of the mechanism, and friction shoes having inclined faces co-operable with said keen angle and blunt angle faces of said block.

In witness that I claim the foregoing I have hereunto subscribed my name this 1st day of Sept. 1921.

JOHN F. O'CONNOR.

Witness:
CARRIE GAILING.